(12) United States Patent
Kitazoe

(10) Patent No.: US 7,379,040 B2
(45) Date of Patent: May 27, 2008

(54) DISPLAY DEVICE AND METHOD FOR TESTING THE SAME

(75) Inventor: Hideaki Kitazoe, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 694 days.

(21) Appl. No.: 10/851,217

(22) Filed: May 24, 2004

(65) Prior Publication Data
US 2005/0024082 A1  Feb. 3, 2005

(30) Foreign Application Priority Data
May 28, 2003  (JP) ............................. 2003-150224

(51) Int. Cl.
*G09G 3/36* (2006.01)
(52) U.S. Cl. ........................... 345/87; 345/89; 345/90; 345/100
(58) Field of Classification Search .................. 345/87, 345/89, 90, 100
See application file for complete search history.

(56) References Cited

U.S. PATENT DOCUMENTS 5,756,372 A * 5/1998 Wakui et al. ................. 438/30
5,945,984 A * 8/1999 Kuwashiro ................... 345/206

FOREIGN PATENT DOCUMENTS

JP          07-333275          12/1995

* cited by examiner

*Primary Examiner*—Richard Hjerpe
*Assistant Examiner*—Leonid Shapiro
(74) *Attorney, Agent, or Firm*—Nixon & Vanderhye P.C.

(57) ABSTRACT

A display device includes: a plurality of pixel electrodes; a counter electrode provided so as to oppose the plurality of pixel electrodes to form a display capacitor between each of the plurality of pixel electrodes and the counter electrode; a plurality of storage capacitor electrodes provided so as to respectively oppose the plurality of pixel electrodes to form storage capacitors therebetween; a storage capacitor line electrically connecting together the plurality of storage capacitor electrodes; a test storage capacitor line terminal electrically connected to the storage capacitor line; and a test counter electrode terminal electrically connected to the counter electrode.

9 Claims, 3 Drawing Sheets

DISPLAY DEVICE AND METHOD FOR TESTING THE SAME

CROSS REFERENCE TO RELATED APPLICATIONS

The present application claims priority under 35 USC §119(a) to Japanese Patent Application No. 2003-150224, which is incorporated herein by reference.

BACKGROUND OF THE INVENTION

1. Field of the Invention

The present invention relates to a display device including: a plurality of pixel electrodes; a counter electrode provided so as to oppose the plurality of pixel electrodes to form a display capacitor between each of the plurality of pixel electrodes and the counter electrode; a plurality of storage capacitor electrodes provided so as to respectively oppose the plurality of pixel electrodes to form storage capacitors therebetween; and a storage capacitor line electrically connecting together the plurality of storage capacitor electrodes, and the present invention also relates to a method for testing the same.

2. Description of the Background Art

When manufacturing a liquid crystal panel, various tests are performed in various manufacturing steps.

Japanese Laid-Open Patent Publication No. 7-333275 discloses providing shorting lines to various signal lines such as scanning lines and source lines around the edge of a substrate of a liquid crystal panel for a display test, performing a display test by giving various signals to the shorting lines, and shaving (cutting) off the shorting lines after the test. It also discloses separately providing test terminals for controlling various signal lines such as scanning lines and source lines using a plurality of transistors in order to perform further display tests after cutting off the shorting lines.

In the liquid crystal panel manufacturing process, the test terminals are cut off after performing various electrical tests and display tests on the liquid crystal panel. Thereafter, a polarization plate is attached to the display surface of the liquid crystal panel. In a polarization plate test performed after attaching the polarization plate to the liquid crystal panel, the liquid crystal panel is tested as to the presence/absence of minute defects such as a scratch on the polarization plate or foreign matter or bubbles stuck between the polarization plate and the substrate, wherein it is necessary to control the liquid crystal panel in a white display or a black display so that the defects, etc., are more conspicuous.

Test methods in which the liquid crystal panel is lit in a solid-pattern display such as a white display or a black display are generally classified into solid-pattern lighting tests in which signals are input directly to signal input terminals of scanning lines and data lines of the liquid crystal panel without using the liquid crystal driver IC, and actual driving tests in which signals are input to signal input terminals of scanning lines and data lines using the liquid crystal driver IC. In these tests, a test probe is used for inputting signals to the signal input terminals.

Recent liquid crystal panels include a total of about 4000 scanning lines and data lines for an XGA (Extended Graphics Array; resolution: 1024×768 dots) class and a total of about 6000 scanning lines and data lines for a UXGA (Ultra Extended Graphics Array; resolution: 1600×1200 dots) class, with the same number of signal input terminals for the scanning lines and data lines, whereby the signal input terminals are arranged at a very small pitch, which is typically 50 to 70 μm. Therefore, it is necessary to use an expensive test probe that can be used with a large number of terminals and a small terminal pitch. Moreover, another requirement for such a test probe is that there should be no contact failure between the test probe and the signal input terminals when controlling the liquid crystal panel in a white display or a black display so that it is possible to test the liquid crystal panel as to the presence/absence of minute defects such as a scratch on the polarization plate or foreign matter or bubbles stuck between the polarization plate and the substrate, in a polarization plate test, for example. However, in view of the number of terminals and the terminal arrangement pitch as shown above, it is believed that the limit for the contact reliability in an actual manufacturing process will be about 5% in terms of the contact failure occurrence rate even when using a probe alignment device with a high-precision alignment mechanism in order to ensure a positional precision of the test probe. In worst cases, a contact failure occurs and the display will not be lit normally, thereby leaving defects undiscovered and passing the defective product to the following step, thus resulting in a loss of work time or a loss of material in that step. Therefore, in order to minimize the occurrence of the contact failure, it is necessary to perform a test probe alignment operation and a test probe cleaning operation.

SUMMARY OF THE INVENTION

It is an object of the present invention to provide a display device and a method for testing the same, in which it is not necessary to use an expensive test probe that can be used with a large number of terminals and a small terminal pitch in a test where a solid-pattern is displayed.

The present invention, which achieves the object set forth above, includes: a plurality of pixel electrodes; a counter electrode provided so as to oppose the plurality of pixel electrodes to form a display capacitor between each of the plurality of pixel electrodes and the counter electrode; a plurality of storage capacitor electrodes provided so as to respectively oppose the plurality of pixel electrodes to form storage capacitors therebetween; a storage capacitor line electrically connecting together the plurality of storage capacitor electrodes; a test counter electrode terminal electrically connected to the counter electrode; and a test storage capacitor line terminal electrically connected to the storage capacitor line.

With such a display device, if a predetermined voltage is applied between the test counter electrode terminal and the test storage capacitor line terminal, there is an equal potential difference between each of all the pixel electrodes and the counter electrode, whereby it is possible to produce a predetermined solid-pattern display. Therefore, in a solid-pattern lighting test, it is not necessary to use an expensive test probe that can be used with a large number of terminals and a small terminal pitch, unlike in a case where a solid-pattern display such as a white display or a black display is produced by inputting signals via closely-arranged signal input terminals of signal input lines such as scanning lines and/or data lines.

Moreover, in a conventional technique disclosed in Japanese Laid-Open Patent Publication No. 7-333275, a plurality of transistors are separately provided as a test circuit in order to perform further tests after cutting off the shorting lines, thus lowering the production yield of liquid crystal panels. In contrast, with the display device described above, it is not necessary to form such test transistors.

The display device of the present invention may be a display device, wherein:

the display device further includes signal input lines electrically connected to the plurality of pixel electrodes via switching elements;

a signal input terminal arrangement area is formed where signal input terminals of the signal input lines are provided; and at least one of the test counter electrode terminal and the test storage capacitor line terminal is provided in the signal input terminal arrangement area.

In a conventional technique disclosed in Japanese Laid-Open Patent Publication No. 7-333275, transistors need to be formed around the edge of the liquid crystal panel, thus hindering the narrowing of the bezel. However, such a problem does not occur if the test counter electrode terminal and/or the test storage capacitor line terminal are provided in the signal input terminal arrangement area as described above. Herein, the signal input line is, for example, a scanning line to which a gate signal is sent and/or a data line to which a source signal is sent.

The display device of the present invention may be a display device, wherein:

a plurality of signal input terminals are arranged at a predetermined pitch in the signal input terminal arrangement area; and the arrangement pitch of the plurality of signal input terminals is 50 to 70 μm.

With a display device in which the signal input terminals are arranged at a very small pitch, i.e., 50 to 70 μm, when a lighting test is performed, it is necessary to use a probe alignment device with a high-precision alignment mechanism for ensuring the positional precision of the test probe, and a contact failure with the signal input terminals is still likely to occur even when using such a probe alignment device. Therefore, the present invention is particularly advantageous in a case where the signal input terminals are arranged at a very small pitch, i.e., 50 to 70 μm.

At least one of the test counter electrode terminal and the test storage capacitor line terminal may have such a size that a circle with a diameter of 0.5 mm can be included therein.

If the test counter electrode terminal and/or the test storage capacitor line terminal have such a size that a circle with a diameter of 0.5 mm can be included therein, the test probe can be brought into contact with the terminals without a contact failure and without having to perform high-precision alignment. Therefore, it is possible to eliminate the need for a probe alignment device with a high-precision alignment mechanism, thereby reducing the testing cost and thus the cost of the panel. In addition, it is also possible to eliminate a loss of work time, which may occur due to the alignment of the test probe and the cleaning of the test probe for minimizing the occurrence of the contact failure, and to eliminate a loss of work time or a loss of material in the following step, which may occur due to a defective product being passed to that step.

While the display device of the present invention is not limited to any particular type, the display device of the present invention may be, for example, of a liquid crystal display type, i.e., a liquid crystal display device, including:

an active matrix substrate including the plurality of pixel electrodes;

a counter substrate provided so as to oppose the active matrix substrate and including the counter electrode thereon; and a liquid crystal layer provided so as to be interposed between the active matrix substrate and the counter substrate.

With the display device of the present invention, it is possible to produce a predetermined image display such as a white display or a black display by applying a predetermined voltage between the counter electrode and the storage capacitor line, for performing various tests on the display device. For example, where the display device includes a polarization plate provided on the display surface thereof, it is possible to test the display device as to the presence/absence of minute defects such as a scratch on the polarization plate or foreign matter or bubbles stuck between the polarization plate and the substrate.

BRIEF DESCRIPTION OF THE DRAWINGS

Other objects, features and advantages will be apparent from the following description taken in conjunction with the accompanying drawings.

DETAILED DESCRIPTION OF THE PREFERRED EMBODIMENTS

An embodiment of the present invention will now be described with reference to the drawings.

Figure 1:
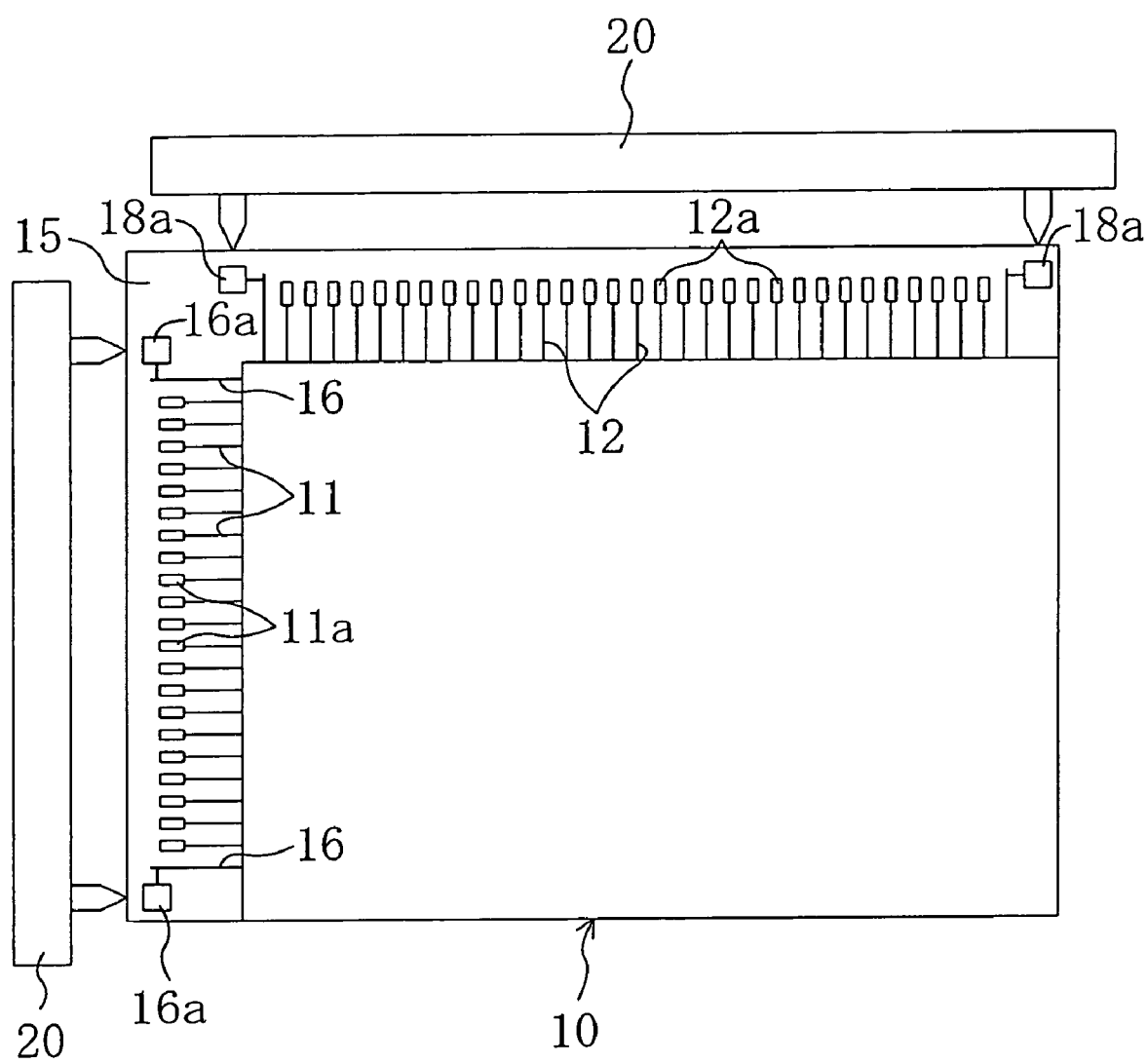
FIG. 1 is a plan view illustrating a liquid crystal display device according to an embodiment of the present invention.
Figure 2:
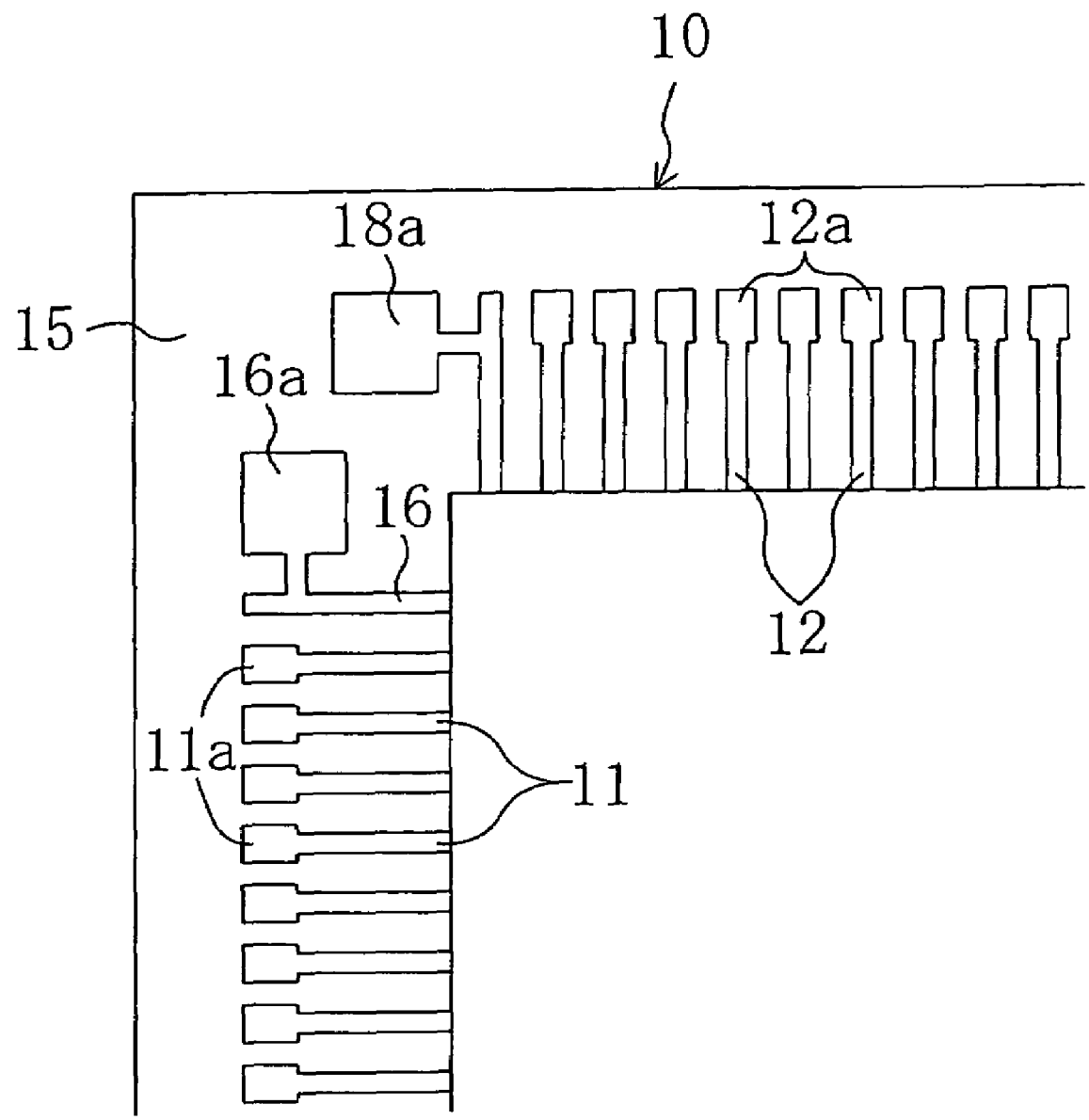
FIG. 2 is a plan view illustrating a signal input terminal arrangement area of the liquid crystal display device according to the embodiment of the present invention.
Figure 3:
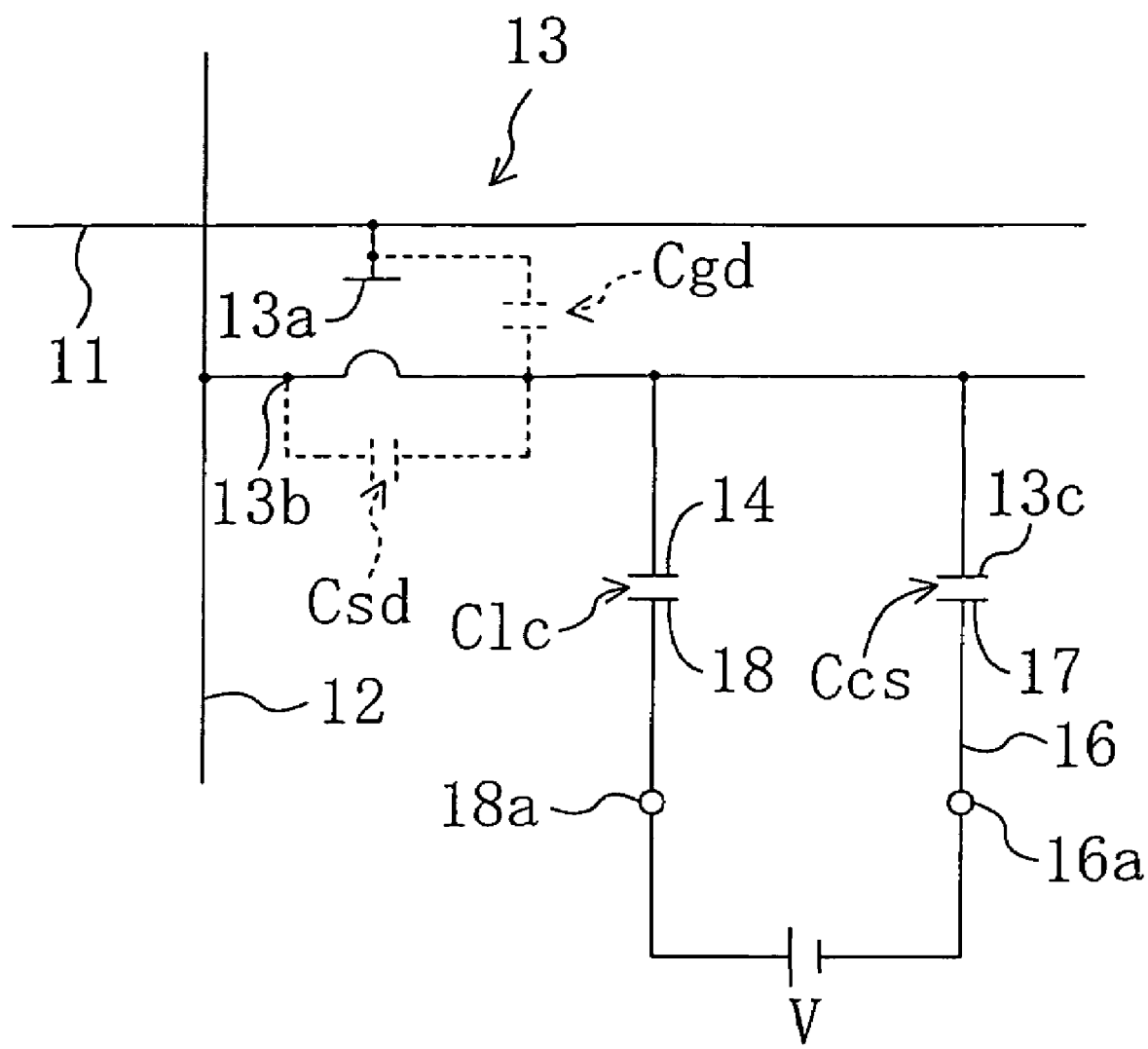
FIG. 3 is a diagram illustrating an equivalent circuit of the liquid crystal display device according to the embodiment of the present invention.

FIG. 1 to FIG. 3 illustrate a liquid crystal display device 10 according to the embodiment of the present invention.

The liquid crystal display device 10 is of an active matrix type in which the display surface has a rectangular shape elongated in the horizontal direction. Specifically, the liquid crystal display device 10 includes an active matrix substrate, a counter substrate opposing the active matrix substrate, and a liquid crystal layer interposed between the substrates.

Provided on the active matrix substrate are a plurality of scanning lines (signal input lines) 11 extending parallel to one another in the longitudinal direction of the display surface, and a plurality of data lines (signal input lines) 12 extending parallel to one another in the width direction of the display surface.

A TFT (thin film transistor) 13 and a pixel electrode 14 are provided at each intersection between the scanning line 11 and the data line 12. A gate electrode 13a of the TFT 13 is electrically connected to the scanning line 11, a source electrode 13b to the data line 12, and a drain electrode 13c to the pixel electrode 14. Scanning line terminals (signal input terminals) 11a of the scanning lines 11 are arranged at a predetermined pitch in the vertical direction along the left side portion. Data line terminals (signal input terminals) 12a of the data lines 12 are arranged at a predetermined pitch in the horizontal direction along the upper side portion. Thus, the left side portion and the upper side portion of the active matrix substrate form a signal input terminal arrangement area 15 where the scanning line terminals 11a and the data line terminals 12a are provided. The arrangement pitch of the scanning line terminals 11a and the data line terminals 12a is very small, i.e., about 50 to 70 μm, for an XGA class and a UXGA class.

Storage capacitor lines 16 are provided between the scanning lines 11 so as to extend along the scanning lines 11. The storage capacitor lines 16 are connected together and extended to a position above the uppermost scanning line terminal 11a in the signal input terminal arrangement area 15 of the left side portion of the active matrix substrate, and to a position below the lowermost scanning line terminal 11a therein, and are electrically connected to test storage capacitor line terminals 16a provided at these positions. The test storage capacitor line terminal 16a is a rectangular terminal each side of which is 0.5 mm or longer (or a circular terminal whose diameter is 0.5 mm or longer). Each storage capacitor line 16 is electrically connected to a plurality of storage capacitor electrodes (hereinafter referred to as "CS") 17 respectively opposing, via an insulating layer, the plurality of pixel electrodes 14 (more accurately, the drain electrodes 13c electrically connected to the pixel electrodes 14) along the storage capacitor line 16, forming storage capacitors Ccs between the CS's 17 and the pixel electrodes 14.

A counter electrode (hereinafter referred to as "COM") 18, which is a single-piece electrode, is provided on the counter substrate. Routing wires are extended from the COM 18 to a position on the right of the rightmost data line terminal 12a in the upper side portion of the signal input terminal arrangement area 15 of the active matrix substrate, and to a position on the left of the leftmost data line terminal 12a therein, and are electrically connected to test counter electrode terminals 18a provided at these positions. The test counter electrode terminal 18a is a rectangular terminal each side of which is 0.5 mm or longer (or a circular terminal whose diameter is 0.5 mm or longer). A liquid crystal capacitor (display capacitor) Clc is formed between the COM 18 and each pixel electrode 14. Moreover, the COM 18 is electrically connected to the storage capacitor lines 16. Therefore, the liquid crystal display device 10 is of a CS-on-COM type in which the COM 18 and the CS 17 are at the same potential. Note that, as will be described later, since the liquid crystal display device 10 is tested while the COM 18 and the CS 17 are not electrically shorted with each other, the connecting portion between the COM 18 and the CS 17 is provided in such a place that they can be connected together after the test.

In the liquid crystal display device 10, each pixel is defined by one pixel electrode 14, a portion of the COM 18 corresponding to that pixel electrode 14, and a portion of the liquid crystal layer interposed therebetween. In each pixel, a gate signal is sent to the scanning line 11 to turn ON the TFT 13 and, in such a state, a source signal is sent to the data line 12 to give a predetermined charge to the pixel electrode 14, whereby a predetermined voltage is applied across the liquid crystal layer between the pixel electrode 14 and the COM 18, i.e., the liquid crystal capacitor Clc, thus modulating the orientation of the liquid crystal molecules in the liquid crystal layer and adjusting the light transmittance thereof to produce a display. Moreover, when giving a charge to the pixel electrode 14, a charge is also stored in the storage capacitor Ccs, being in parallel to the liquid crystal capacitor Clc, whereby the lowering of the voltage applied to the liquid crystal capacitor Clc is suppressed.

Next, a polarization plate test method for the liquid crystal display device 10 will be described.

The test is performed while the electrical connection between the COM 18 and the CS 17 is released, and is performed by applying a predetermined voltage between the test counter electrode terminal 18a and the test storage capacitor line terminal 16a, i.e., between the COM 18 and the CS 17, using a test probe 20. Then, there is an equal potential difference between each of all the pixel electrodes 14 and the COM 18, whereby a uniform voltage is applied to all the liquid crystal capacitors Clc, thus producing a white or black solid-pattern display. Thus, minute defects such as a scratch on the polarization plate or foreign matter or bubbles stuck between the polarization plate and the substrate, are made more conspicuous, and the test is performed by visually checking the presence/absence thereof.

The potential difference between the pixel electrode 14 and the COM 18 occurs as follows. When a voltage V is applied between the COM 18 and the CS 17, the liquid crystal capacitor Clc and the storage capacitor Ccs are in series with each other, whereby a voltage Vd as expressed by the following expression is applied across the liquid crystal capacitor Clc.

$$Vd = V \times \frac{Clc}{Clc + Ccs}$$

This means that the voltage V applied between the COM 18 and the CS 17 dictates the voltage to be applied across the liquid crystal capacitor Clc, and that the display can be controlled by the voltage V. Thus, by applying a predetermined voltage between the COM 18 and the CS 17, it is possible to produce a white display or a black display. Note that the TFT 13 is in a floating state because the gate electrode 13a and the source electrode 13b are both open, and the gate-drain capacitor Cgd and the source-drain capacitor Csd will be additional capacitors. However, they are influential only on the charge/discharge time, which is the amount of time required before reaching the voltage Vd to be applied across the liquid crystal capacitor Clc. Moreover, even if the TFT 13 is ON, the same state can be obtained by inputting no source signal.

Now, the alignment of the test probe 20 with respect to the test counter electrode terminal 18a and the test storage capacitor line terminal 16a will be discussed.

Where the outer shape precision of the liquid crystal panel is L, the machining precision of the position of the positioning pin is M and the machining precision of the position of the test probe is N, the absolute precision will be expressed by the following expression.

$$\text{Absolute Precision} = \sqrt{L^2 + M^2 + N^2}$$

With L=0.4, M=0.2 and N=0.2, representing typical precision values, the absolute precision will be 0.49. In the liquid crystal display device 10, each of the test counter electrode terminal 18a and the test storage capacitor line terminal 16a is a rectangular terminal each side of which is 0.5 mm or longer (or a circular terminal whose diameter is 0.5 mm or longer). With the size of the test counter electrode terminal 18a and the test storage capacitor line terminal 16a, it is no longer necessary to use a probe alignment device with a high-precision alignment mechanism for ensuring a positional precision of the test probe 20 (e.g., an automatic alignment mechanism in which positioning alignment marks are provided within the panel, which are then imaged by an alignment CCD camera and subjected to image processing by a computer), and a sufficient alignment precision can be ensured by mechanical positioning based on the outer shape of the panel. Therefore, it is possible to perform the polarization plate test with a simple jig, thus reducing the testing cost.

As described above, with the liquid crystal display device 10, a polarization plate test, for example, can be performed by applying a predetermined voltage between the test counter electrode terminal 18a and the test storage capacitor line terminal 16a, i.e., between the COM 18 and the CS 17, using the test probe 20, whereby there is an equal potential difference between each of all the pixel electrodes 14 and the COM 18, thus producing a white or black solid-pattern display. Therefore, in a solid-pattern lighting test, it is not necessary to use an expensive test probe that can be used with a large number of terminals and a small terminal pitch, unlike in a case where a solid-pattern display such as a white display or a black display is produced by inputting signals via the scanning line terminals 11a and the data line terminals 12a, which are closely arranged together.

Moreover, in a conventional technique disclosed in Japanese Laid-Open Patent Publication No. 7-333275, a plurality of transistors are separately provided as a test circuit in order to perform further tests after cutting off the shorting lines, thus lowering the production yield of liquid crystal panels. In contrast, with the liquid crystal display device 10, it is not necessary to form such test transistors.

Furthermore, in a conventional technique disclosed in Japanese Laid-Open Patent Publication No. 7-333275, transistors need to be formed around the edge of the liquid crystal panel, thus hindering the narrowing of the bezel. In contrast, with the liquid crystal display device 10, such a problem does not occur because the test counter electrode terminals 18a and the test storage capacitor line terminals 16a are provided in the signal input terminal arrangement area 15.

Moreover, the test counter electrode terminals 18a and the test storage capacitor line terminals 16a are each a rectangular terminal each side of which is 0.5 mm or longer (or a circular terminal whose diameter is 0.5 mm or longer), thereby eliminating the need for a probe alignment device with a high-precision alignment mechanism for ensuring the positional precision of the test probe 20, reducing the testing cost and thus the cost of the panel. It is also possible to eliminate a loss of work time, which may occur due to the alignment of the test probe 20 and the cleaning of the test probe 20 for minimizing the occurrence of the contact failure, and to eliminate a loss of work time or a loss of material in the following step, which may occur due to a defective product being passed to that step.

Note that while the present embodiment is directed to the liquid crystal display device 10, the present invention is not limited thereto, but may be applied to any other suitable display device.

Moreover, while the present embodiment is directed to a polarization plate test of the liquid crystal display device 10, the present invention is not limited thereto, but may be applied to any other suitable display test.

It is clear that a wide variety of alternative embodiments can be made without departing from the spirit and scope of the present invention, and the present invention shall not be restricted to any particular embodiment thereof, but shall be defined only by the appended claims.

What is claimed is:

1. Display device, comprising:
a plurality of pixel electrodes;
a counter electrode provided so as to oppose the plurality of pixel electrodes to form a display capacitor between each of the plurality of pixel electrodes and the counter electrode;
a plurality of storage capacitor electrodes provided so as to respectively oppose the plurality of pixel electrodes to form storage capacitors therebetween;
a storage capacitor line electrically connecting together the plurality of storage capacitor electrodes;
a test counter electrode terminal electrically connected to the counter electrode;
a test storage capacitor line terminal electrically connected to the storage capacitor line;
one substrate provided with the plurality of pixel electrodes, the plurality of storage capacitor electrodes, and the storage capacitor line; and
another substrate provided with the counter electrode,
wherein the test counter electrode terminal and the test storage capacitor line terminal are formed on a same substrate, either the one or the other substrate.

2. The display device of claim 1, wherein:
the display device further comprises signal input lines electrically connected to the plurality of pixel electrodes via switching elements;
a signal input terminal arrangement area is formed where signal input terminals of the signal input lines are provided; and
at least one of the test counter electrode terminal and the test storage capacitor line terminal is provided in the signal input terminal arrangement area.

3. The display device of claim 2, wherein:
a plurality of signal input terminals are arranged at a predetermined pitch in the signal input terminal arrangement area; and
the arrangement pitch of the plurality of signal input terminals is 50 to 70 μm.

4. The display device of claim 2, wherein the signal input line is a scanning line to which a gate signal is sent and/or a data line to which a source signal is sent.

5. The display device of claim 1, wherein at least one of the test counter electrode terminal and the test storage capacitor line terminal has such a size that a circle with a diameter of 0.5 mm can be included therein.

6. The display device of claim 1, wherein the display device is of a liquid crystal display type, comprising:
an active matrix substrate including the plurality of pixel electrodes;
a counter substrate provided so as to oppose the active matrix substrate and including the counter electrode thereon; and
a liquid crystal layer provided so as to be interposed between the active matrix substrate and the counter substrate.

7. A method for testing a display device, comprising:
a plurality of pixel electrodes;
a counter electrode provided so as to oppose the plurality of pixel electrodes to form a display capacitor between each of the plurality of pixel electrodes and the counter electrode;
a plurality of storage capacitor electrodes provided so as to respectively oppose the plurality of pixel electrodes to form storage capacitors therebetween; and
a storage capacitor line electrically connecting together the plurality of storage capacitor electrodes,
wherein a predetermined display is produced by applying a predetermined voltage between the counter electrode and the storage capacitor line.

8. The method for testing a display device of claim 7, wherein the predetermined display is a white display or a black display.

9. The method for testing a display device of claim 7, being a method for testing a polarization plate provided on a display surface of the display device.

* * * * *